Sept. 8, 1931.  J. WHYTE  1,822,554
BRAKE
Filed March 16, 1928   3 Sheets-Sheet 1

Inventor.
John Whyte,
By Churchill Parker Carlson
Attys.

Sept. 8, 1931.    J. WHYTE    1,822,554
BRAKE
Filed March 16, 1928    3 Sheets-Sheet 2

Inventor:
John Whyte,
By Chindahl Parker Carlson
Attys.

Sept. 8, 1931.  J. WHYTE  1,822,554
BRAKE
Filed March 16, 1928  3 Sheets-Sheet 3
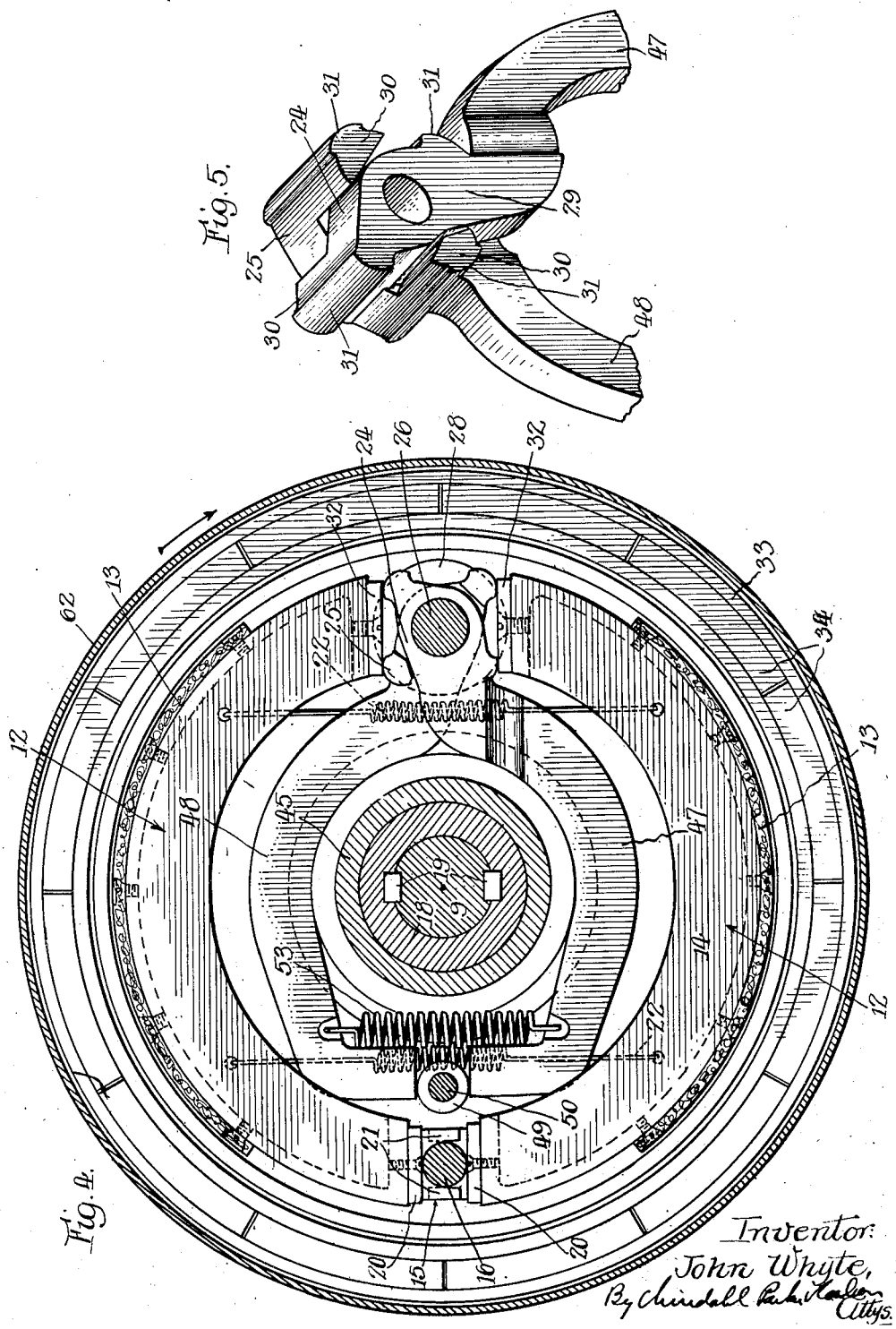

Patented Sept. 8, 1931

1,822,554

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed March 16, 1928. Serial No. 262,122.

This invention relates to friction brakes and contemplates more particularly a brake of the so-called momentum type.

Brakes of this class when applied to a vehicle generally include a pair of coacting friction elements which when brought into gripping engagement derive an actuating force from the motion or momentum of the vehicle whose motion is to be controlled, this force being augmented mechanically and applied to a friction brake associated with the wheels or other moving part of the vehicle.

One object of the invention is to provide a brake of the above type having a new and improved means for augmenting the force derived through the gripping engagement of the friction elements and applying this force to the friction brake proper.

Another object is to provide a novel and efficient means for restoring the operating parts of the friction operator for the brake to brake-released position when the pressure between the friction elements is relieved.

A further object is to provide in an expanding brake a novel arrangement of cams for actuating the braking means.

Still another object is to provide for the compact arrangement within a brake drum of the levers for actuating the braking means cooperating with the drum.

It is also an object of the present invention to provide in an electric brake, wherein the braking action is derived through the gripping engagement of a pair of magnetic friction elements, a new and improved means providing a floating mounting for the rotatable friction element.

A general object of the invention is to provide a brake of the momentum type which is simple and rugged in construction, powerful and reliable in its operation, and capable of withstanding the severe wear and tear encountered in the use of brakes on heavy trucks, busses and the like.

Other objects and advantages of the invention will become apparent from the following detailed description taken in connection with the accompanying drawings, in which Figure 1 is a sectional view of a brake embodying the features of the present invention as applied to a vehicle wheel, the section being taken substantially along the line 1—1 of Fig. 2.

Fig. 4 is a sectional view taken substantially along the line 4—4 of Fig. 1.

Fig. 5 is a fragmentary perspective view of the brake actuating cams.

Figure 1:
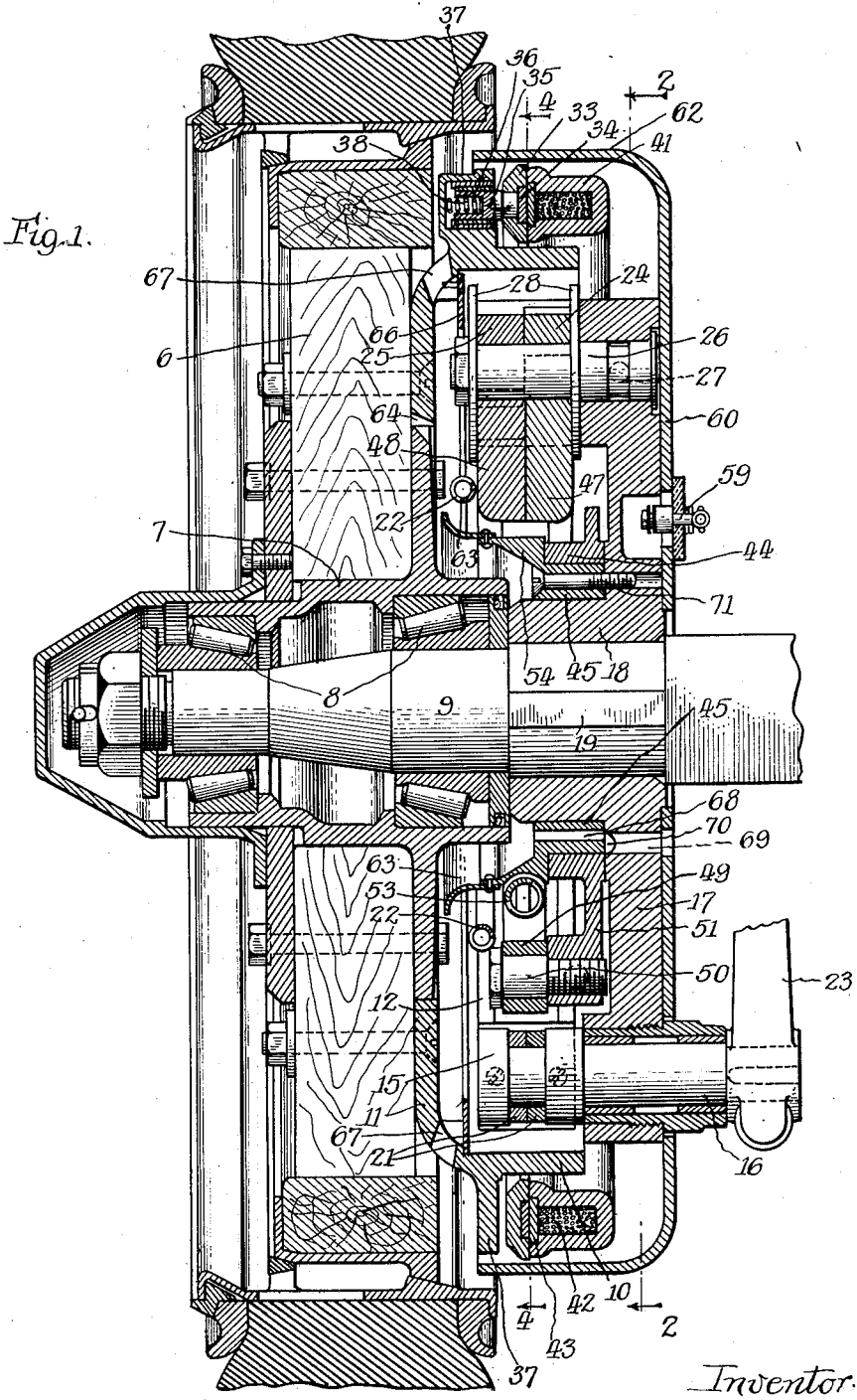

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the exemplary form illustrated in the drawings, the invention is embodied in a brake for a vehicle wheel 6, such as is commonly used on heavy trucks and the like. The hub portion 7 of the wheel is mounted through the usual bearings 8 on the end of a dead or stationary axle 9.

The motion of the wheel is intended to be controlled by a friction brake of the expansible type including a drum 10 which rotates with the wheel 6 and drum-engaging members mounted internally of the drum. In the present instance the drum opens inwardly of and is carried by the wheel. To this end it is formed at one end with an inturned flange 11 which is secured against the inner side of the wheel 6 as by bolting the flange 11 to the spokes of the wheel.

The friction braking means for engaging the internal peripheral surface of the drum for exerting the braking action comprises a pair of shoes 12 of segmental form, each having a covering 13 secured as by screws to the outer portion of the shoes. The covering is composed of material having high heat and wear resisting qualities and the coefficient of friction thereof may be relatively lower than that of fabric linings, because of the enormous actuating force which is obtainable with the present brake actuating mechanism. For purposes which will presently appear, the brake shoes are of U-shaped cross section having annular reinforcing ribs 14. The two shoes are annularly arranged in end to end relation about the axle 9.

As a means for holding the shoes against rotation within the drum, means associated with the pairs of adjacent end portions of the shoes are provided, which also serve as means for spreading the end portions apart, thereby expanding the shoe coverings against the drum. One of these means includes an oscillatory cam 15 (Fig. 4) rigid with a rock shaft 16 projecting through and journaled in one end of a member 17 (Fig. 2) which has a hub portion 18 received on the axle 9 and fixedly secured thereto as by keys 19. The cam 15 may be substantially rectangular in form and arranged to work against end plates 20 carried by two adjacent ends of the shoes 12. To hold the shoes centered relative to the drum and also against axial movement relative thereto, the cam 15 is made in two axially alined parts between which there is an annular groove receiving in overlapping relation two lugs 21 (Fig. 1) formed on the end plates 20 of the respective shoes. Springs 22 anchored to the reinforcing ribs of the shoes serve to draw the ends of the shoes together against the cam 15.

The cam 15 is intended to be operated manually so that the brake may be used for emergency or parking purposes. To this end the rock shaft 16 is extended beyond the member 17 and provided with a crank arm 23 which may be actuated in any preferred manner.

The ends of the brake shoes opposite the cam 15 are separated by two coaxially arranged cams 24 and 25 which may be oscillated independently of each other and in different directions to expand the brake shoes, such expansion being effected by a common momentum operator to be presently described. In the present instance these cams are mounted for oscillation on a stationary pin 26 secured in the end of the stationary member 17 opposite the shaft 16. A set screw 27 entering a groove in the pin 26 serves to hold the pin securely in place. Washers 28 (Figs. 1, 2 and 4) are clamped against the opposite sides of the cams 24 and 25 and overlap the adjacent ends of the shoes 12 so as to hold the latter in fixed position along the drum axis.

As is best shown in Fig. 5, the cams 24 and 25 are identical in construction, each having a central portion 29 with two lugs 30 projecting therefrom parallel to the cam axis and spaced so as to receive between them the central portion 29 of the other cam. These lugs provide diametrically opposed arcuate surfaces 31 which are disposed parallel to the cam axis so as to work against the opposed end surfaces of the shoes 12, which surfaces are provided by plates 32 carried by the shoes. When the cams are assembled in interlocking relation as shown in Fig. 5, a compact structure is formed. While the thickness of the central portion 29 of each cam is substantially less than the width of the end plates 32, the lengths of the two arcuate surfaces 31 on each cam are substantially equal to that of the wear plates. Thus when either cam is oscillated the expansive force applied to the shoes will act substantially centrally of the shoes thereby avoiding any tendency of the shoes to buckle.

The friction operator for deriving the brake-actuating force from the momentum of the wheel and for augmenting this force for application to either of the cams 24 or 25, includes a pair of friction elements adapted to be brought into gripping engagement by the energization of an electromagnetic winding associated with one of the elements. One of these elements rotates during motion of the vehicle and in the present instance comprises an annulus 33 encircling the drum 10 and having a plurality of segmental plates 34 set in an annular groove therein and providing wear surfaces substantially flush with the flat inwardly facing surfaces of the annulus. These plates 34 may be spot welded or otherwise secured against rotation in the annulus.

Figure 3:
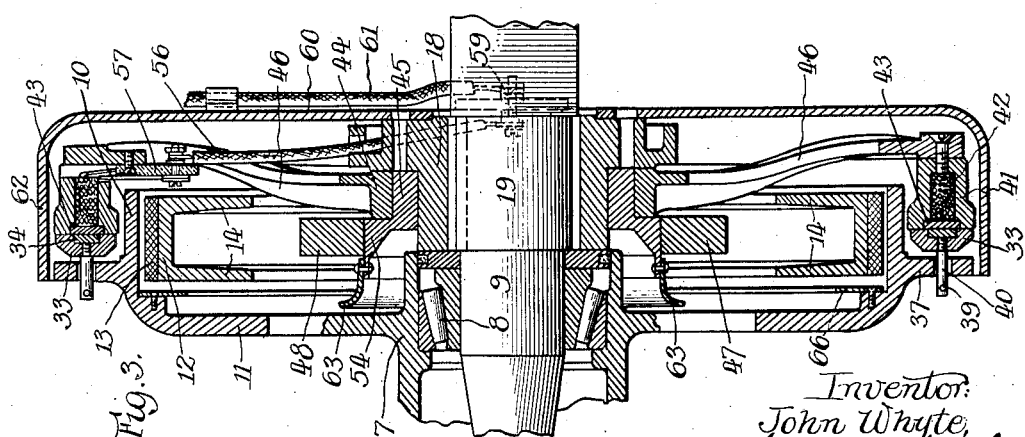
Fig. 3 is a section taken along the line 3—3 of Fig. 2.

Projecting rigidly from the annulus at spaced points around the circumference are a plurality of studs 35, the ends of which are received in recesses 36 (Fig. 1) in a flanged portion 37 preferably formed integral with the drum around the outer periphery and near the closed end thereof. Compression springs 38 seated in the ends of the studs 35 and acting against the closed end of recess 36 constantly urge the annulus in an axial direction and toward the open end of the drum. The extent of this movement is determined by cross pins 39 (Fig. 3) in studs 40 also carried by the annulus and projecting through holes in the flange 37. Thus while the drum is being removed from the axle or placed thereon during the initial assembling operation, a fixed relation is maintained between the floating armature and the drum owing to the limited range of axial movement allowed by the pins 40. This range of movement is sufficient to compensate for lateral wobbling of the drum so as to allow for a true axial floating of the armature relative to the drum. Through the use of a plurality of small compression springs 38 which may be constructed of equal strengths, a uniform and accurately determinable axial pressure is exerted around the entire periphery of the magnetic elements with the result that the force required to maintain continuous mechanical contact between the surfaces of the coacting elements may be reduced to a minimum.

It will be noted that the annulus 33 is located a substantial distance from the open end of the drum thereby reducing the axial dimensions of the brake-operating means by allowing for compactness in the arrangement of the other friction element now to be described.

The driven element of the friction operator constitutes an extremely powerful electromagnet and in the form illustrated comprises a ring 41 of substantially U-shaped cross section and of the same diameter as the annulus 33. A winding 42 comprising a series of turns of insulated wire is wound in the form of an annulus and disposed in an annular groove defined by the concentric flange portions of the ring 41. Wear plates 43 of non-magnetic material are secured to the ring 41 with their opposite edges seated on annular shoulders formed in the flanges of the ring 41. The end surfaces of the ring which are disposed on opposite sides of the plates 43 constitute magnetic pole faces which, it will be observed, are disposed opposite the corresponding surfaces of the annulus 33, the latter therefore constituting an armature through which the magnetic flux produced by energization of the winding 42 may thread in a circuitous path.

With the friction elements thus constructed, it will be apparent that gripping engagement will take place between the coacting surfaces of the wear plates while the soft iron annulus 33 and the ring 41 will support the wear plates and provide a magnetic circuit of low reluctance because the pole faces of the magnet are substantially in contact with the armature during gripping engagement of the elements. Thus a substantially closed flux circuit is provided at all times, and this condition is maintained, even though the winding 42 is not energized, because of the action of the springs 38, which resiliently urge the annulus 33 toward the magnet ring and thus maintain intimate mechanical contact at all times between the wear plates of the two elements.

To support the ring 41 opposite the armature ring 33 for oscillatory movement about the drum axis, a member (Figs. 2 and 3) is employed comprising a hub portion 44 rotatably mounted on a bearing 45 adjacent the hub of the member 17 and having two alined radial arms 46, the outer ends of which are rigidly secured to the back of the magnet by screws. Preferably the arrangement is such that the arms 46 extend substantially perpendicular to the arms of the member 17 when the magnet ring 41 is in normal brake-released position, allowance being thereby made for the location of portions of the member 17 and the arms 46 in common vertical planes so as to minimize the axial dimension of the brake as a whole. By securing the arms 46 directly to the back of the magnet ring 41, the major portion of the ring projects over the edge of the drum, which also makes for efficient utilization of the available space about the vehicle wheel and also for the simplicity of the magnet construction. Thus the ring 41 is of uniform cross section throughout its entire circumference and can be formed out of straight stock of the proper cross sectional shape.

The frictional force rendered available by the gripping engagement of the ring 41 and its armature when the winding 42 is energized is, in the present instance, augmented mechanically and applied to the brake shoes by two independently operable mechanisms, one adapted for operation when the magnet is energized with the wheel rotating in one direction, the other being actuated during the application of the brake when the wheel is rotating in the opposite direction. These mechanisms comprise two levers or crank arms 47 and 48 rigid with the respective cams 24 and 25, and a means for operatively connecting the magnet ring to the free ends of the respective cranks. In the present instance the cranks 47 and 48 are formed integral with the expanding cams and are arcuate in shape so as to be disposed on opposite sides of the axle 9 when the cams are assembled in the brake structure. Preferably the relation of each crank arm and its expanding cam is such that the crank arms are positioned to work between the reinforcing ribs 14 of the brake shoes in their outward movement from normal brake-released position, thereby allowing for the proper degrees of movement without interference by the brake shoes.

The free end portions of the crank arms 47 and 48 are turned inwardly in opposed relation and terminate on opposite sides of a roller 49 on a stud 50 carried by a short arm 51 which is formed integral with the hub portion 44 of the magnet supporting member. This arm extends perpendicular to the supporting arms 46 and the two constitute a bell crank lever swingable about the drum axis and forming a part of each of the two independent augmenting mechanisms for expanding the brake shoes. Thus a one-way connection is provided between the bell crank arm 51 and the two cranks 47 and 48 so that as the bell crank is oscillated in one direction from normal brake-released position the crank arm 47 will be moved outwardly and the cam 24 will be oscillated to expand the shoes. Angular movement of the magnet ring in the other direction actuates the crank 48 and the cam 25.

The lengths of the arms 47 and 48 and the size of the cams 24 and 25 are so proportioned as to give the desired multiplication of the actuating force available at the magnet ring. Thus relatively long crank arms 47 and 48 can be employed because their lengths are not limited by the short radial distance between the expanding cams and the axle. Consequently the desired leverage can be obtained by the use of large and therefore ruggedly constructed expanding cams. Another advantage resulting from the use of large expanding cams is that a very small fraction of one revolution of the drum is required to set the brake following the energization of the magnet winding.

An extremely simple and efficient means is provided for restoring the magnet ring and the parts of the augmenting mechanisms to brake-released position when the magnet is deenergized. This means comprises a coiled tension spring 53 having its opposite ends anchored to the respective crank arms 47 and 48 adjacent their free ends. The spring being under tension at all times tends to draw the crank arms toward each other, this movement being limited by engagement of the intermediate portions of the crank arms with stops provided by the peripheral surfaces of a flange 54 on the bearing member 45. This arrangement, it will be observed, provides for the extension of the spring 53 from opposite ends in the use of the different crank arms, while setting the brakes, that is to say, one of the crank arms and the stop associated therewith constitutes an anchor for one end of the spring while the other end of the spring is being extended by the actuation of the other crank arm to set the brake.

The winding 42 is intended to be variably energized from any suitable source of electric current such as a vehicle storage battery. In the present instance the connections with the terminal ends of the winding are in one instance through a grounded conductor including the operating parts of the brake and in the other instance through an insulated conductor which allows for oscillation of the magnet ring in either direction from its normal brake released position. The latter connection includes a flexible insulated conductor 56 one end of which is attached to an insulated block 57 and suitably connected to one terminal end of the winding. The other end of the conductor is threaded through a hole 58 (Fig. 2) in the member 17 adjacent the axle and is anchored to a binding post 59 carried by and insulated from an enclosing casing 60. The post 59 serves as a stationary point of attachment for a flexible conductor 61 leading to the storage battery of the vehicle. It is contemplated that means such as a manually controllable rheostat will be provided for varying the degrees of energization of the magnet winding.

The casing 60 comprises a flat plate secured by a series of bolts to the member 17 and having a flange 62 which overlies the drum and the flange 37 thereon, thereby effectually protecting all of the operating parts of the brake from dust and dirt.

To prevent lubricants employed on the wheel bearings from running onto the braking surfaces of the drum, an annular deflector ring 63 is secured to the flange 54 of the bearing member 45 and is adapted to direct the lubricants emitted from the bearings 8 onto the inner surfaces of the flange on the wheel hub 7. The lubricants travel outwardly along this surface by centrifugal action and escape through a hole 64 (Fig. 1) or are entrapped in an annular pocket 65 defined by the drum flange 11 and a ring 66 secured thereto. Holes 67 are provided in the flange through which the lubricant accumulating in the pocket may be thrown by centrifugal action. Alined passages 68 and 69 (Fig. 1) formed in the bearing member 45 and the stationary member 17 allow another path for the escape of lubricants forced into the wheel bearings. An annular pocket 70 is formed in the member 17 which overlaps the bearing surfaces on which the hub 44 of the magnet supporting member is mounted so as to keep this surface lubricated.

The brake thus provided is simple to assemble and disassemble, these operations being performed from the outer end of the axle. In assembling the brake, the member 17 is first keyed to the axle 9 after which the magnet supporting member is placed in position and its bearing member 45 inserted, the whole structure being held together by a series of screws 71. Thereafter the cranks 47 and 48 and the cams 15, 24 and 25 are mounted on their respective studs 16 and 26 and then the shoes 12 are placed in the position in which they are held by the springs 22. The final operation is to place the wheel with the drum and armature assembled thereon onto the axle in the usual way.

It will be apparent that the brake thus provided is of extremely rugged construction and well adapted to withstand without frequent attention the wear and tear incident to heavy duty service, such as is encountered in the use of brakes on busses, trucks and the like. The unit as a whole is compact and simple in structure and all of the operating parts are completely enclosed and protected.

Figure 2:
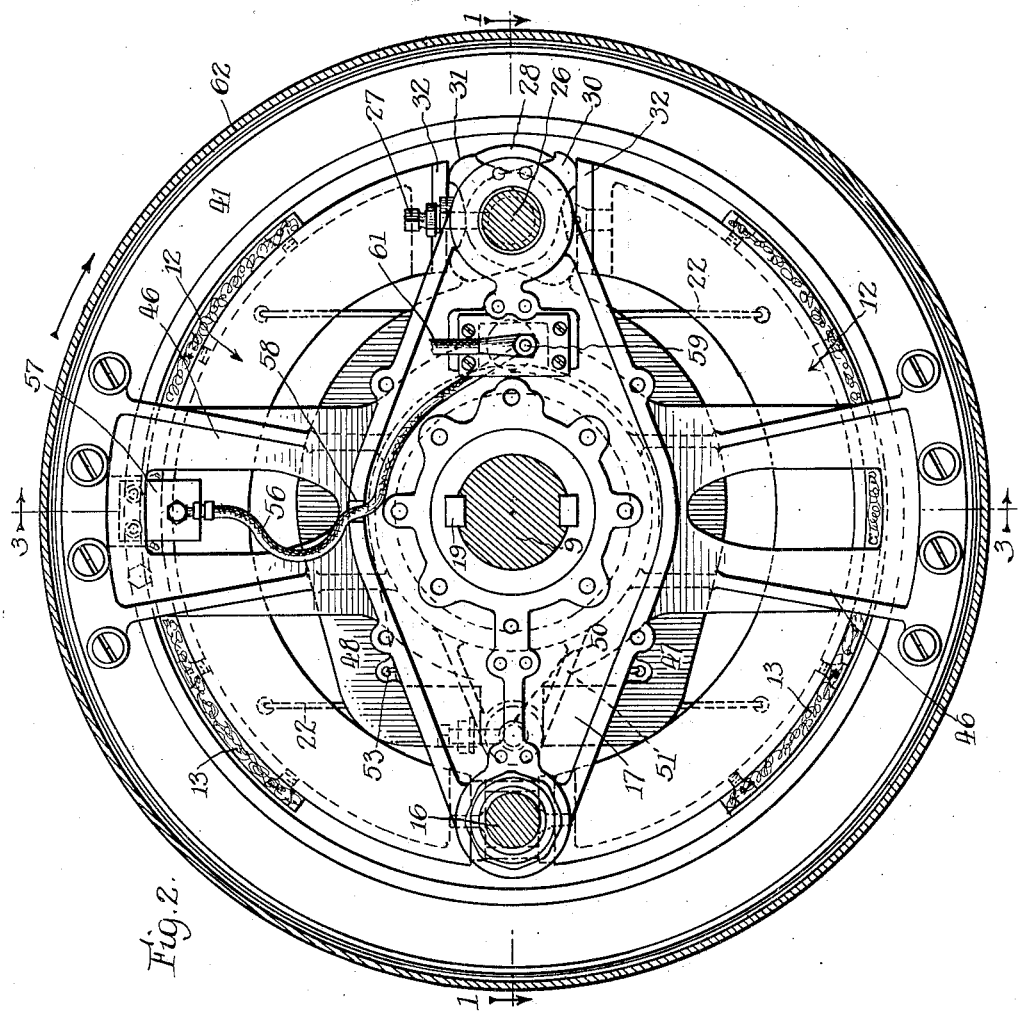
Fig. 2 is a sectional view taken along the line 2—2 of Fig. 1.

To summarize briefly the operation of the brake, let it be assumed that the parts are in normal brake-released position as shown in the drawings and that the wheel is rotating in the direction of the arrow in Fig. 2 when the current is applied for setting the brake. When this occurs, the frictional force produced by the axial pressure between the magnet ring 41 and the rotating ring armature 33 moves the ring and its bell crank supporting structure angularly in the direction of motion of the wheel. In such movement, the roller 49 engaging the end of the crank arm 48 moves the crank through a small angle away from its stop, thereby oscillating the cam 25 which spreads the shoes against the drum. Thus, the brake becomes set in a very small fraction of one revolution of the drum after energization of the magnet and thereafter the magnet ring slips relative to the armature to permit further motion of the wheel during the retardation.

In such application of the brake, the restoring spring 53 is extended from the end which is attached to the crank 48, the other end being held stationary by the crank 47 and its stop surface on the flange 54. Now, as soon as the magnet is deenergized, the spring 53 instantly draws the crank 48 back against its stop, the magnet and its supporting member being also restored to brake-released position by the action of the crank 48 on the roller 49 of the bell crank.

When the magnet is energized with the wheel rotating in a direction reverse to that above assumed, the bell crank will move angularly in a direction to actuate the crank arm 47 and the expanding cam 24. In such application of the brake, the restoring spring 53 will be extended from the end attached to the crank arm 47 while the crank arm 48 constitutes the anchor for the opposite end of the spring.

I claim as my invention:

1. A vehicle brake of the momentum type comprising, in combination, a drum rotatable during motion of the vehicle, braking means within said drum having adjacent separable end portions, a pair of annularly arranged friction elements adapted for gripping engagement by a force acting axially thereof, one of said elements being carried by said drum, a bell-crank member having an arm supporting said other element for oscillatory movement about the axis of said drum, a pair of expanding cams both associated with said end portions, and a pair of independently operable crank arms one for operating each of said cams, the free ends of said arms being associated with the short arm of said bell-crank so that one crank arm is operated to expand said braking means upon the oscillation of the bell-crank in one direction and the other crank arm is operated in the oscillation of the bell-crank in the reverse direction, and spring means operable to restore said crank arms, said bell-crank, and said driven element to brake-released position.

2. A vehicle brake of the momentum type comprising, in combination, a rotatable drum, braking means within said drum having adjacent separable end portions, a pair of coaxially arranged expanding cams mounted between said end portions, a pair of independently operable crank arms one rigid with each of said cams, a pair of coacting friction elements adapted for axial gripping engagement, one rotatable with said drum, the other being mounted for oscillatory movement, and connecting means between said oscillatory element and the free ends of said crank arms, said connecting means being operable to actuate one of said arms upon movement of said oscillatory element in one direction from normal brake-released position and to actuate said other arm upon movement of said oscillatory element in the reverse direction.

3. A brake of the momentum type comprising, in combination, a rotatable drum, braking means within said drum having adjacent separable end portions, a pair of coaxially arranged cams associated with said end portions and operable independently to expand said braking means upon oscillation in different directions, a pair of coacting friction elements adapted for axial gripping engagement, one rotatable with said drum, the other being mounted for oscillatory movement, and two independently operable connecting means between said oscillatory element and said braking means, said connecting means being arranged to oscillate said cams selectively upon movement of said oscillatory elements in opposite directions from its normal brake-released position, and means tending to retain said oscillatory element in brake-released position.

4. A brake of the momentum type comprising, in combination, a rotatable drum, braking means within said drum having adjacent separable end portions, a pair of coaxially arranged cams associated with said end portions and operable independently to expand said braking means upon oscillation in different directions, a pair of co-acting friction elements adapted for gripping engagement by a force acting axially thereof, one of said elements being rotatable with said drum, the other being mounted for oscillatory movement, a pair of independently operable crank arms for operating said cams selectively, and a connection between said oscillatory element and said crank arms operable to actuate one of said crank arms upon movement of said oscillatory element in one direction from normal brake-released position and to actuate said other crank arm upon movement of said oscillatory element in the opposite direction, and stop means preventing movement of said crank arms in one direction from normal brake-released position.

5. A brake of the momentum type comprising, in combination, a drum, friction braking means cooperating with a peripheral surface on said drum, a pair of friction elements adapted for coacting gripping engagement by a force acting axially of said drum, one of said elements being rotatable during rotation of said drum, the other being mounted for oscillatory movement about the drum axis, and two independently operable actuating mechanisms for applying to said braking means the force derived through the gripping engagement of said elements, said mechanism being disposed adjacent to and on opposite sides of the drum axis and operated selectively by said oscillatory element upon movement in opposite directions away from its normal brake released position.

6. A brake of the momentum type comprising, in combination, a drum which rotates during the motion of a part to be braked, said drum being supported co-axially relative to an axle, braking means engageable with said drum, a pair of co-axially arranged cams mounted for oscillation about an axis spaced from and extending parallel to said axle, said cams being operable upon angular movement in opposite directions to press said braking means against said drum, a pair of crank arms of a length greater than the radial distance between said axle and the axis of said cams, said arms being disposed on opposite sides of said axle, and means adapted to derive an actuating force from the momentum of the part to be braked, and means actuated by said momentum means and operable to actuate the respective crank arms upon movement in opposite directions from a normal brake-released position.

7. A brake of the momentum type comprising, in combination, a drum which rotates during the motion of a part to be braked, said drum being supported in co-axial relation to an axle, braking means within said drum having adjacent separable end portions, a pair of expanding cams arranged co-axially between said end portions and adapted for oscillation about an axis spaced from and extending parallel to said axle, crank arms each rigid with one of said expanding cams and extending beyond said axle on opposite sides thereof, means operatively associated with the free ends of said crank arms and operable upon movement in one direction from normal brake-released position to move one of said arms away from said axle and upon movement in the opposite direction to move said other arm away from the axle, and means adapted to derive an actuating force from the momentum of the part to be braked and operable to actuate said last mentioned means.

8. A brake of the momentum type comprising, in combination, a drum rotatable during the motion of a part to be braked, a pair of shoes arranged in end-to-end relation within said drum and having two adjacent separable end portions, said shoes having parallel side ribs defining a U-shaped cross section, a pair of independently movable expanding cams associated with said end portions, oscillatory crank arms, one for operating each of said expanding cams, said crank arms being mounted for actuating movement in the space between the ribs of said brake shoes, and means operable to derive an actuating force from the momentum of the part to be braked whereby to actuate said crank arms selectively depending upon the direction of the motion of the part to be braked.

9. A brake having, in combination, a drum which rotates during the motion of a part to be braked, an arcuate brake shoe within said brake having spaced reinforcing ribs, an actuating cam associated with an end portion of said shoe, and a crank arm for actuating said cam movable in the plane of said shoe and into the space between said ribs.

10. A brake having, in combination, a rotatable drum, braking means within said drum having adjacent end portions, and a pair of co-axially arranged expanding members mounted between said end portions for independent oscillation about a fixed axis, each of said members comprising a relatively narrow central portion, and a pair of lugs projecting therefrom and providing parallel cam surfaces on diametrically opposite sides of said axis.

11. A brake having, in combination, a rotatable drum, braking means within said drum having adjacent end portions providing opposed parallel end surfaces, and a pair of co-axially arranged expanding members mounted between said surfaces for independent oscillatory movement about a fixed axis, each of said members comprising a relatively narrow central portion, and a pair of lugs projecting therefrom, said lugs providing parallel cam surfaces of a width equal substantially to the width of said end surfaces, the lugs on each of said members being spaced to receive between them the central portion of said other member.

12. A brake having, in combination, a rotatable drum, braking means within said drum having adjacent end portions providing opposed parallel end surfaces, and a pair of coaxially arranged expanding members mounted between said surfaces for independent oscillatory movement about a fixed axis, means on each of said members providing two parallel cam surfaces adapted to work against said opposed surfaces on diametrically opposite sides of said axis, said cam surfaces having portions disposed on opposite sides of the center lines of said end surfaces.

13. A brake of the momentum type comprising, in combination, a drum which rotates during the motion of a part to be braked, braking means cooperating with said drum, means providing a friction surface which rotates during the rotation of said drum, a rigid friction element mounted for oscillatory movement and adapted for gripping engagement with said rotatable surface, force augmenting mechanism for applying to said braking means the frictional force derived through the engagement of said element and said surface including two levers mounted for movement in opposite directions from a normal brake-released position and adapted to be moved selectively away from brake-released position by direct engagement between their free ends and said rigid friction element, and a coiled contractile spring anchored at its opposite ends to the free ends of said levers so as to act on said rigid element in restoring the brake to released position with the same mechanical advantage as that with which said element acts on said connection, said spring normally being under tension.

14. An electric brake of the momentum type comprising, in combination, a drum which rotates during the motion of a part to be braked, braking means within said drum, a pair of annular magnetic elements concentric with the drum axis disposed externally of said drum, one comprising an armature ring carried by said drum and providing an inwardly facing friction surface which is spaced from the open end of said drum, a magnet ring carrying a winding adapted when energized to produce a force of magnetic attraction acting axially of said elements to cause frictional gripping engagement thereof, means secured to said ring and supporting the ring adjacent the armature surface and in overlying relation with respect to the open end of said drum, and a force augmenting mechanism operable to apply to said braking means the frictional force derived through the gripping engagement of said elements.

15. An electric brake of the momentum type comprising, in combination, a drum which rotates during the motion of a part to be braked, braking means within said drum, a pair of annular magnetic elements, one mounted for oscillatory movement about the drum axis, said other element being floatingly mounted on the drum and adapted to rotate therewith, spring means acting at a plurality of points around the circumference of said rotatable element to urge that element into contacting engagement with said oscillatory element, a winding carried by said oscillatory element and adapted when energized to cause gripping engagement of the elements, and a force augmenting mechanism operated by oscillation of said element and adapted to actuate said braking means.

16. An electric brake of the momentum type comprising in combination, a drum which rotates during the motion of a part to be braked, braking means within said drum, a pair of annular magnetic elements, one mounted for oscillatory movement about the drum axis, said other element being floatingly mounted on the drum and adapted to rotate therewith, means associated with said armature at a plurality of points around its circumference for preventing relative rotation between said armature and the drum and acting to urge said armature into intimate mechanical contact with said oscillatory element, an electromagnetic winding carried by said ring and adapted when energized to cause frictional gripping engagement between the elements, and force augmenting mechanism operated by said oscillatory element and adapted to actuate said braking means.

17. In an electric brake for arresting the motion of a vehicle wheel, the combination of a rotatable member carried by said wheel, a pair of annular friction elements composed of magnetic material and adapted for axial gripping engagement to determine the braking action applied to said wheel, means supporting one of said elements for rotation with said member and also for floating movement relative to said member in a direction axially of said wheel, a plurality of compression springs arranged in annularly spaced relation around the rotatable element and each acting between such element and an abutment on said member to urge the element away from said wheel whereby to maintain continuous mechanical contact between the friction surfaces of said elements, and an electromagnetic winding carried by one of said elements and adapted when energized to cause gripping engagement of the elements.

18. In an electric brake for arresting the motion of a vehicle wheel, the combination of a rotatable member carried by said wheel, a pair of annular friction elements composed of magnetic material and adapted for axial gripping engagement to determine the braking action applied to said wheel, means supporting one of said elements for rotational movement with said member and also for movement in a direction axially of said wheel, means supporting said other element and acting to prevent axial movement of such element in a direction away from said member, spring means acting to urge said rotatable element in an axial direction toward said last mentioned element whereby to maintain continuous mechanical contact between the coacting surfaces of the elements, means acting to limit the movement of said rotatable element relative to said member whereby to maintain a fixed relation of the element and the member during the mounting of said member relative to said second mentioned friction element, and a magnetic winding carried by one of the elements and adapted when energized to cause gripping engagement of the elements.

19. In an electric brake for arresting the motion of a vehicle wheel, the combination of a rotatable member carried by said wheel, a pair of annular friction elements composed of magnetic material and adapted for axial gripping engagement to determine the braking action applied to said wheel, one of said elements being carried by said member and adapted for a limited range of axial movement relative to the member, spring means acting on said rotatable element to move the same in an axial direction away from said member and operable within the limited range of movement of the rotatable element to maintain yieldable mechanical contact between the rotatable element and said other friction element, and an electromagnetic winding carried by one of said elements and adapted when energized to cause gripping engagement of the elements.

20. A brake of the momentum type combining a rotatable drum, braking means within said drum having a reinforcing rib extending around the drum and projecting toward the drum axis, expanding means for said braking means including an elongated rigid crank arm associated with said braking means on one side of said drum extending around the drum axis, the relative positions of said rib and said arm being such that the arm is adapted to pass beyond the inner edge of said rib in moving outwardly to expand said braking means, and a pair of coacting friction elements, one of which rotates with said drum, the other being mounted for gripping engagement with the rotatable element and arranged to actuate said crank arm when moved away from a normal brake-released position.

21. A brake of the momentum type combining a rotatable drum, braking means within said drum, means for expanding said braking means including a rigid crank arm operatively associated with the braking means on one side of the drum and extending across the drum with its free end projected beyond the drum axis, a pair of axially engageable friction elements, one rotatable with said drum, a bell crank lever mounted for oscillation about the drum axis and having one arm connection to said other friction element and another arm operatively associated with the free end of said crank arm whereby oscillation of said last mentioned element will actuate said crank arm through the medium of said bell crank lever.

22. A brake of the momentum type combining a rotatable drum, braking means within said drum, means for expanding said braking means, a pair of rigid crank arms disposed wholly within said drum and each adapted to actuate said expanding means, a pair of axially engageable friction elements, one rotatable with said drum, the other being mounted for oscillation about the drum axis, and means actuated by said oscillatory element in moving away from brake-released position and operable to actuate one or the other of said crank arms depending on the direction of movement of the oscillatory element.

23. A brake of the momentum type combining a rotatable drum, braking means within said drum, means for expanding said braking means including a pair of rigid crank arms each mounted to oscillate about a fixed axis adjacent the drum surface, said arms projecting from said axis across the drum and disposed on opposite sides of the drum axis for movement away from and toward the drum axis in the setting and the releasing of the braking means, a pair of axially engageable friction elements, one rotatable with said drum, the other being mounted for oscillation about the drum axis and adapted to move one or the other of said crank arms outwardly depending on the direction of movement of the element away from brake-released position.

24. A brake of the momentum type combining a rotatable drum, a friction braking member extending around the drum surface and having relatively movable end portions, a rigid annular friction element disposed concentric with the drum and by electromagnetic action to derive a brake-actuating force from the motion of said drum, and to apply such force to one or the other of said end portions depending upon the direction of drum rotation, and a coiled contractile spring arranged to be extended from its opposite ends in the movement of said element away from brake-released position, said spring serving to restore said element to brake-released position upon interruption of the electromagnetic action, the force of said spring being applied directly to said element so that the spring acts in restoring the element to brake-released position with a mechanical advantage equal to that with which the actuating force is applied by said element.

In testimony whereof, I have hereunto affixed my signature.

JOHN WHYTE.